United States Patent
Gong et al.

(10) Patent No.: US 12,308,737 B2
(45) Date of Patent: May 20, 2025

(54) POWER TRANSFORMING APPARATUS AND AIR CONDITIONER INCLUDING THE SAME

(71) Applicant: LG Electronics Inc., Seoul (KR)

(72) Inventors: Phillsik Gong, Seoul (KR); Songhee Yang, Seoul (KR); Jeongeon Oh, Seoul (KR); Sanghyeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 235 days.

(21) Appl. No.: 17/952,832

(22) Filed: Sep. 26, 2022

(65) Prior Publication Data
US 2023/0155487 A1   May 18, 2023

(30) Foreign Application Priority Data
Nov. 16, 2021 (KR) .................. 10-2021-0157864

(51) Int. Cl.
*H02M 1/42* (2007.01)
*F04B 35/04* (2006.01)
(Continued)

(52) U.S. Cl.
CPC ........... *H02M 1/4258* (2013.01); *F04B 35/04* (2013.01); *F04B 49/06* (2013.01); *H02M 1/0009* (2021.05);
(Continued)

(58) Field of Classification Search
CPC .. H02M 1/4258; H02M 1/083; H02M 1/0009; H02M 1/0058
See application file for complete search history.

(56) References Cited

U.S. PATENT DOCUMENTS 8,098,505 B1 * 1/2012 Choi ................... H02M 1/4225
                                                    323/272
8,994,343 B2   3/2015 Ohshita et al.
(Continued)

FOREIGN PATENT DOCUMENTS

EP          1298782 A2 *  4/2003  ............ H02M 5/458
EP          2866341       4/2015
(Continued)

OTHER PUBLICATIONS

Extended European Search Report in European Appln No. 22194403.6, dated Mar. 22, 2023, 8 pages.
(Continued)

*Primary Examiner* — Sisay G Tiku
(74) *Attorney, Agent, or Firm* — Fish & Richardson P.C.

(57) ABSTRACT

The present disclosure discloses a power transforming apparatus capable of reducing a stress of a converter switch during a PFC operation, an operation method thereof, and an air conditioner including the same. To this end, the power transforming apparatus according to the present disclosure may determine the number of converters for performing a PFC operation based on a magnitude of input power and a speed of the motor. Furthermore, target converter channels are arbitrarily selected using a random function at an initial stage of a PFC operation so as not to add a stress to a switch device of any one converter. In addition, in order to disperse a stress to all switches, phases are individually controlled to perform switching operations while changing converters that match the number of converters for performing a PFC operation in a preset cycle, for example, whenever a zero-crossing is detected.

13 Claims, 6 Drawing Sheets

(51) Int. Cl.
  *F04B 49/06* (2006.01)
  *H02M 1/00* (2007.01)
  *H02M 1/08* (2006.01)
(52) U.S. Cl.
  CPC ..... *H02M 1/083* (2013.01); *F04B 2203/0201* (2013.01); *F04B 2203/0208* (2013.01); *F04B 2203/0209* (2013.01)

(56) References Cited

U.S. PATENT DOCUMENTS

| | | | | |
|---|---|---|---|---|
| 9,843,269 | B2* | 12/2017 | Ohshita | H02M 1/4225 |
| 2006/0132104 | A1* | 6/2006 | Li | G05F 1/70 |
| | | | | 323/207 |
| 2011/0110134 | A1* | 5/2011 | Gaboury | H02M 1/4225 |
| | | | | 363/126 |
| 2012/0313614 | A1 | 12/2012 | Ohshita et al. | |
| 2016/0218624 | A1* | 7/2016 | Ishizeki | H02M 1/4225 |
| 2016/0248318 | A1* | 8/2016 | Ishizeki | H02M 1/4225 |
| 2018/0034403 | A1* | 2/2018 | Kim | H02M 1/4291 |
| 2023/0155487 | A1* | 5/2023 | Gong | H02M 1/0009 |
| | | | | 363/13 |

FOREIGN PATENT DOCUMENTS

| | | | | |
|---|---|---|---|---|
| JP | 2011-138736 | | 7/2011 | |
| JP | 2013-169105 | | 8/2013 | |
| KR | 20150162239 | | 11/2015 | |
| WO | WO-2013121687 A1 * | 8/2013 | .......... H02M 3/1584 |
| WO | WO-2013190998 A1 * | 12/2013 | .......... H02M 1/4225 |

OTHER PUBLICATIONS

Notice of Allowance in Korean Appln. No. 10-2021-0157864, mailed on Apr. 11, 2024, 14 pages (with English translation).
Office Action in Korean Appln. No. 10-2021-0157864, mailed on Jun. 22, 2023, 11 pages (with English translation).

* cited by examiner

|  | PFC ON | PFC OFF |
|---|---|---|
| MOTOR SPEED | ABOVE 18Hz | BELOW 15Hz |
| INPUT POWER | ABOVE 900W | BELOW 300W |

|       | ENABLE  | DISABLE |
|-------|---------|---------|
| 601 — CH 1 | 900W    | 300W    |
| 602 — CH 2 | 1,500W  | 1,300W  |
| 603 — CH 3 | 2,500W  | 2,300W  |

POWER TRANSFORMING APPARATUS AND AIR CONDITIONER INCLUDING THE SAME

CROSS-REFERENCE TO RELATED APPLICATIONS

Pursuant to 35 U.S.C. § 119(a), this application claims the benefit of an earlier filing date of and the right of priority to Korean Patent Application No. 10-2021-0157864, filed on Nov. 16, 2021, the contents of which are incorporated by reference herein in its entirety.

TECHNICAL FIELD

The present disclosure relates to a power transforming apparatus and an air conditioner including the same, and more particularly, to a power transforming apparatus capable of dispersing a stress of a converter switch during a PFC operation, and an air conditioner including the same.

BACKGROUND

In general, a compressor of an air conditioner uses a motor as a driving source. A motor generally has a structure in which a rotating shaft located inside a stator is supported by a bearing in physical contact therewith. In recent years, in accordance with the need to develop a motor rotating at a high speed, a motor for high-speed rotation in which a rotating shaft is supported with no physical contact by a magnetic bearing has been developed. In either case, the motor is supplied with power through a power transforming apparatus.

It is generally known that such a power transforming apparatus mainly includes a rectifier unit, a power factor improving unit, and an inverter type power transforming unit. Specifically, an AC commercial voltage output from a commercial power source is rectified by the rectifier unit. A voltage rectified by the rectifier unit is stored in a capacitor, and then supplied to an inverter to generate AC power for driving the motor. Furthermore, a DC-DC converter for improving power factor may be provided between the rectifier unit and the inverter.

Meanwhile, components that account for the largest fraction of the causes of failure in the power transforming apparatus are known as capacitors and power semiconductor devices (IGBTs, MOSFETs, etc.). Among them, the power semiconductor device performs power conversion while repeatedly performing on/off operations, and at this time, PFC loss occurs, and the loss is dissipated as heat. For example, as the number of times a temperature change of a switch rapidly changes according to the on/off operation of the converter (product) to which the power semiconductor device is applied increases, the power semiconductor device is subjected to a stress, which becomes a main cause of shortening the life of the product.

Accordingly, Korean Patent Laid-Open No. 10-2015-0162239 (hereinafter, 'Prior Document 1') relates to an interleaved PFC control method and system, and discloses a method of setting output voltage duty ratios to be the same by using two boost converters. Specifically, a method of controlling current balancing of two converters to reduce a current PFC output voltage ripple is disclosed. However, according to Prior Document 1, an output voltage of a slave converter is determined by an output voltage of a master converter. In this case, since an individual phase control of the converter is not carried out, unnecessary switching occurs, and maximum efficiency cannot be guaranteed for each load. Accordingly, the unnecessary switching of the power semiconductor device occurs to increase the possibility of shortening the life of the power semiconductor device.

Furthermore, U.S. Pat. No. 8,098,505 ('Prior Document 2') relates to controlling a gate IC by driving two interleaved PFCs, and a gate signal is generated to turn on/off the power semiconductor in a drive IC according to a specific condition. In this case, the gate signal always operates one phase first, which adds a stress to the power semiconductor device that has started an operation first, and this also causes a reduction in the life of the power semiconductor.

In addition, when a stress is added to a specific power semiconductor device, a performance imbalance occurs among a plurality of power semiconductor devices, thereby causing a problem in that heat generation of a reactor connected to each power semiconductor increases.

SUMMARY

Accordingly, the present disclosure provides a power transforming apparatus capable of reducing a stress of a converter switch during a PFC operation, an operation method thereof, and an air conditioner including the same.

Furthermore, the present disclosure provides a power transforming apparatus capable of reducing unnecessary switching by specifying the number of converter channels for performing a PFC operation based on a magnitude of input power, an operating method thereof, and an air conditioner including the same.

Furthermore, the present disclosure provides a power transforming apparatus capable of applying an algorithm to differently control the phase of a converter switch according to a load capacity so as to improve efficiency at a low-load and effectively reduce the number of switching for each converter, an operating method thereof, and an air conditioner including the same.

Furthermore, the present disclosure provides a power transforming apparatus capable of dispersing a switch stress of each converter by arbitrarily setting a switching time and a PFC operation sequence of a plurality of converters without specifying them, an operating method thereof, and an air conditioner including the same.

Furthermore, the present disclosure provides a power transforming apparatus capable of managing the temperature of a reactor by dispersing the switch stress of each converter to dissipate heat from a reactor connected thereto, an operating method thereof, and an air conditioner including the same.

Furthermore, the present disclosure provides a power transforming apparatus capable of performing more stable phase control in consideration of a load fluctuation by applying a hysteresis condition to perform a switching operation in determining the number of converters for performing a PFC operation, an operating method thereof, and an air conditioner including the same.

In order to solve the above problems, a power transforming apparatus according to an embodiment of the present disclosure, which is a power transforming apparatus for driving an inverter to drive a motor, may determine the number of converters for performing a PFC operation based on a magnitude of input power and a speed of the motor.

Furthermore, the power transforming apparatus according to the present disclosure may perform switching by changing converters that match the number of converters for performing a PFC operation in a preset cycle for switch stress dispersion.

In addition, the power transforming apparatus according to the present disclosure may arbitrarily select target converter channels using a random function at an initial stage of a PFC operation so as not to add a stress to a switch device of any one converter, and subsequently perform switching by changing target converter channels (or a combination thereof) for performing a PFC operation whenever a zero-crossing is detected for the switch stress dispersion of the selected target converter channels.

Moreover, the power transforming apparatus according to the present disclosure may differently set enable and disable switching boundary points that match the number of target converter channels (to enable hysteresis switching) based on a magnitude of input power and a speed of a motor for efficient phase control.

In one embodiment, a power transforming apparatus according to the present disclosure, which is a power transforming apparatus for driving an inverter to drive a motor, may include a rectifier unit that rectifies an input AC voltage; a power factor improving unit that performs a PFC operation for improving power factor on a rectified voltage output from the rectifier unit, the power factor improving unit including a plurality of converter channels; a DC link capacitor that stores an output voltage of the power factor improving unit; a current sensing unit located between the rectifier unit and the power factor improving unit; and a controller. Here, when the inverter is driven, the controller may control to determine the number of converter channels for performing a PFC operation among the plurality of converter channels based on input power and a speed of the motor calculated using the current sensing unit, and to perform the PFC operation while changing target converter channels corresponding to the determined number of converter channels at a time satisfying a preset condition.

In one embodiment, the time satisfying a preset condition may be a time at which a current of a reactor located between the power factor improving unit and the rectifier unit satisfies a zero-crossing.

In one embodiment, the power transforming apparatus may further include a detection unit that detects a zero-crossing of the current of the reactor, wherein the controller changes target converter channels corresponding to the determined number of converter channels whenever the zero-crossing is detected by the detection unit, and distributes the switching of the target converter channels to perform the PFC operation for all of the plurality of converter channels.

In one embodiment, the power factor improving unit may include a first converter channel, a second converter channel, and a third converter channel, and each converter channel may be connected to a reactor, and the reactor may be disposed between a switching device of the each converter channel and a diode.

In one embodiment, the controller may determine whether to start the PFC operation based on the calculated input power and the speed of the motor, and detect a zero-crossing of a current flowing through the reactor in response to the PFC operation that has been started so as to perform a PFC operation of target converter channels corresponding to a predetermined sequence.

In one embodiment, the controller may control to perform an initial switching operation with at least one converter channel selected using a random function when the PFC operation is started, and to perform a switching operation by changing a target converter channel according to a switching sequence determined based on the selected at least one converter channel when the zero-crossing is detected while performing the PFC operation.

In one embodiment, the controller may alternately switch the first to third converter channels every half-cycle of a frequency matching the input power and the speed of the motor while performing the PFC operation.

In one embodiment, when changing the number of converter channels for performing the PFC operation according to changes in the input power and the speed of the motor, the controller may control to change an alternating switching period for the first to third converter channels.

In one embodiment, when the number of converter channels for performing the PFC operation decreases according to a decrease of the input power, a value of first input power matching an enable boundary point of a target converter channel may be set to a value greater than a value of second input power matching a disable switching boundary point corresponding thereto.

In addition, an operating method of a power transforming apparatus, which is an operating method of a power transforming apparatus for driving an inverter to drive a motor, and the operating method may include detecting a magnitude of input power and a speed of the motor when the inverter is driven; determining the number of converter channels for performing a PFC operation among a plurality of converter channels based on the detected magnitude of input power and the speed of the motor; and changing target converter channels corresponding to the determined number of converter channels and controlling the PFC operation to be performed at a time satisfying a preset condition.

Furthermore, the power transforming apparatus according to the present disclosure may be applied to a compressor, and implemented as an air conditioner including the compressor. In addition, an operating method of the power transforming apparatus according to the present disclosure may also be implemented as a program executed on a computer performed by at least one processor.

A computer-readable recording medium according to an embodiment of the present disclosure may include a program executed on a computer in which the above-described method of operating the power transforming apparatus is performed by at least one processor.

An air conditioner according to an embodiment of the present disclosure may be implemented to include a compressor to which the above-described power transforming apparatus is applied.

A power transforming apparatus according to the present disclosure, an operating method thereof, and an effect of an air conditioner including the same will be described as follows.

The present disclosure may determine converter channels for initially performing a PFC operation, randomly or by reflecting an operation history, in connection with driving a motor, without specifying them in advance, thereby preventing the life of a specific converter switch from being shortened due to a stress added thereto.

Furthermore, the present disclosure determines the number of converter channels for performing a PFC operation based on a magnitude of input power and a speed of a motor, and performs switching operations by changing the converter channels every half-cycle of a frequency matching a magnitude of system input power while performing the PFC operation. Accordingly, a switch stress is evenly dispersed over a plurality of converter channels while unnecessary switching is eliminated. Accordingly, switching loss may be effectively reduced. Moreover, since a heat generation temperature of a reactor connected to each converter channel is dispersed, it is also possible to manage the temperature of the reactor.

In addition, the present disclosure individually controls a plurality of converter channels to perform switching distribution over all of the plurality of converter channels in an entire load section, thereby allowing temperature management such as dispersing a stress of a switch and dispersing a heat generation temperature of a reactor connected to each converter channel. Accordingly, it is possible to prevent the life of the product from being shortened.

DETAILED DESCRIPTION

Furthermore, the "power transforming apparatus" disclosed herein may be applicable to a compressor driven by driving an inverter to drive a motor, and by using a rotational force of the motor, and an air conditioner including such a compressor.

In addition, a "converter channel" disclosed herein may refer to any unspecified converter among a plurality of converters. Moreover, the "converter channel" may be referred to as a "boost converter", "interleaved converter", or "converter", and in some cases, may be used as a concept to collectively refer to a plurality of converter channels.

Besides, a "first converter channel", a "second converter channel", and a "third converter channel" disclosed herein do not denote a specific converter matching an actual product or a specific sequence. For example, when operating with two converters, it may operate using the first and second converter channels, operate using the second and third converter channels, or operate using the first and third converter channels.

Furthermore, each of "CH1", "CH2", and "CH3" disclosed herein may be understood to denote or refer to any one converter channel, any two converter channels, or all converter channels of the first to third converter channels (i.e., three converter channels).

In addition, a "controller" disclosed herein, which is a generic concept denoting a configuration that controls the operation of each component of the power transforming apparatus, and if necessary, may refer to a 'microcomputer', a 'processor', a 'converter controller', or an 'inverter controller'.

Figure 1:
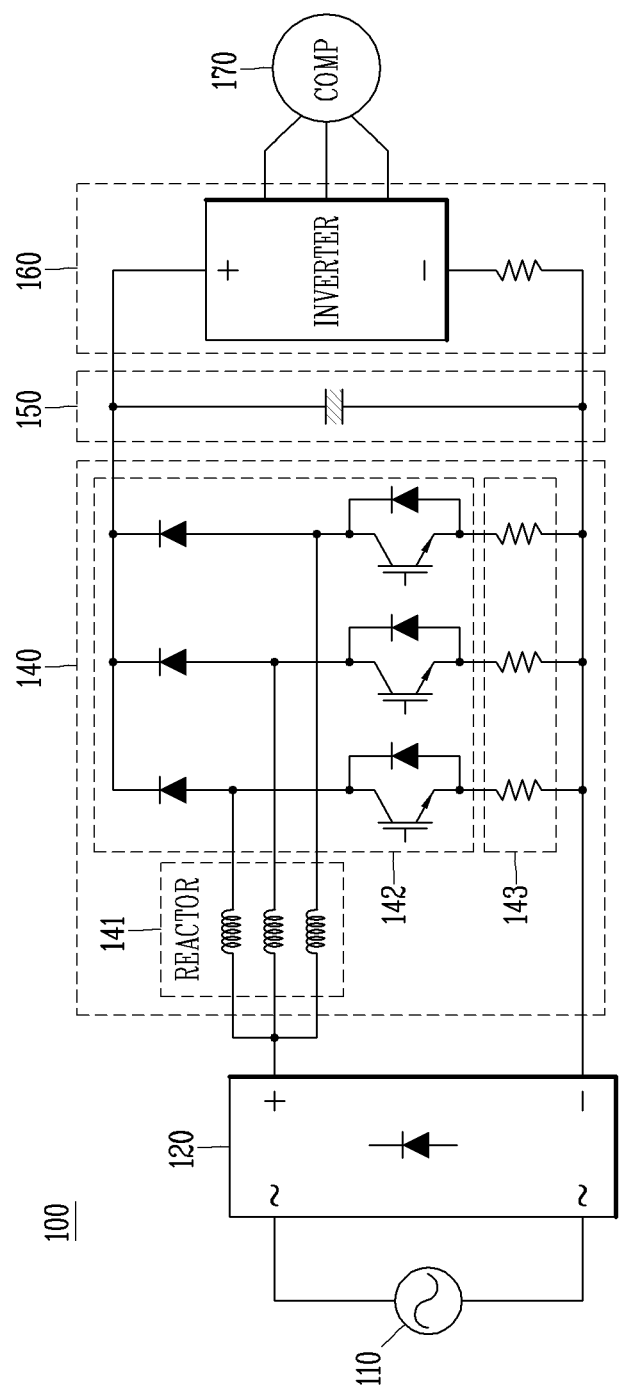
FIG. 1 is a diagram showing a circuit configuration of a power transforming apparatus according to the present disclosure.

FIG. 1 is a diagram showing a circuit configuration of a power transforming apparatus according to the present disclosure.

The power transforming apparatus of FIG. 1 may be used to drive a compressor. During a load operation of a compressor, a switching operation of a booster converter is required by applying a PFC control algorithm to improve power factor. In the present disclosure, the operation of the booster converter associated with efficient PFC control will be mainly described.

In addition, in the present disclosure, an efficient PFC control method is proposed in consideration of an entire load range such as a no-load, a low-load, medium-load, and a high-load.

In FIG. 1, the power transforming apparatus 100 according to the present disclosure receives AC power from a commercial power source, that is, a power supply unit 110, converts power, and then supplies the converted power to a motor 170 connected thereto.

To this end, the power transforming apparatus 100 may include a rectifier unit 120 that rectifies the AC power output from the power supply unit 110, a converter unit 140 including a plurality of converter channels having a power semiconductor device to perform a PFC operation for improving power factor, a DC link capacitor 150, and an inverter unit 160, and the power transforming apparatus 100 may be connected to the motor 170 driven by a current supplied from the inverter unit 160.

Here, the motor 170 has been described on the premise of a motor for a compressor, but is not limited thereto, and may also be applicable to motors of various products driven using a frequency-variable AC voltage, for example, motors of refrigerators, washers, automobiles, cleaners, and the like.

The converter unit 140 may be implemented as a DC-DC converter or a boost converter, and may include a plurality of converter channels (or converter phases/converter switches) 142. For example, the converter unit 140 may include three converter channels 142, and each of the three converter channels 142 may be connected in series with different sensing resistors 143, respectively. Furthermore, each of the three converter channels 142 may include at least one diode and at least one switching device. In addition, each of the three converter channels 142 may be located between the diode and the switching device described above, and may be connected to a reactor (inductor) 141 connected to the rectifier unit 120.

In FIG. 1, three converter channels are connected to one DC link capacitor 150, and each converter channel of the converter unit 140 is connected in parallel with the DC link capacitor 150, respectively. That is, the DC link capacitor 150 has a structure connected in parallel with three power semiconductor devices, respectively.

Furthermore, although not shown, a current sensing unit (not shown) for detecting an input current, for example, a CT, may be included between the reactor 141 and the plurality of converter channels 142. In this case, an input current of the power transforming apparatus 100 may be detected using the current sensing unit, and a magnitude of the input power may be calculated using the detected input current.

The reactor 141 is connected to the rectifier unit 120 located at a front end of the converter unit 140, and the reactor 141 and a switching device of each converter channel of the converter unit 140 are connected to each other. In addition, a diode of the converter unit 140 may be located between the switching device and the DC link capacitor 150 or the sensing resistor 143. Such a switching device is switched by a pulse width modulation (PWM) signal output from a controller or a microcomputer to perform a PFC operation.

In the present disclosure, the plurality of converter channels 142 of the converter unit 140 can be controlled by the controller (or converter controller/microcomputer). Specifically, the controller controls to switch on only one converter channel among the plurality of converter channels 142 or controls to switch the plurality of converter channels 142 in a specific sequence, or to perform a PFC operation by excluding part of the plurality of converter channels 142 from switching.

The DC link capacitor 150 is connected in parallel to the plurality of converter channels 142 and the sensing resistors 143 of the converter unit 140, respectively, and charges a voltage output from the converter unit 140. Although only one DC link capacitor 150 is shown in FIG. 1, two or more DC link capacitors may be provided if necessary. The inverter unit 160 connected to the DC link capacitor 150 converts the DC power of the DC link capacitor 150 into AC power through a plurality of inverter switching devices, and supplies the AC power to the motor 170.

Meanwhile, as the sensing resistors 143 connected in series to the plurality of converter channels 142 of the converter unit 140, a shunt resistor may be used. In this case, the shunt resistor is connected in series with the switching device of each converter channel, respectively, as shown in FIG. 1. In one embodiment, an input current (or input power) may be detected through the shunt resistor.

In the present disclosure, whether to perform the PFC operation of the plurality of converter channels 142 of the converter unit 140 is determined based on a magnitude of the input power and a speed of the motor 170. More specifically, the power transforming apparatus 100 may determine whether to perform the PFC operation based on the magnitude of the input power and the speed of the motor 170, and may determine the number of target converter channels for performing the PFC operation.

Here, the determination of the number of target converter channels should not be understood to refer to only specific converter channels performing the PFC operation. For example, when the number of target converter channels is determined to be two, this denotes that there are two converter channels on which switching operations are subjected to simultaneous switching, and does not denote that two target converter channels for performing switching operations are specified. Accordingly, when the number of target converter channels is determined to be two, the first converter channel and the second converter channel are subjected to simultaneous switching, and subsequently, the second converter channel and the third converter channel (or the first converter channel and the third converter channel) may be subjected to simultaneous switching.

Figure 2:
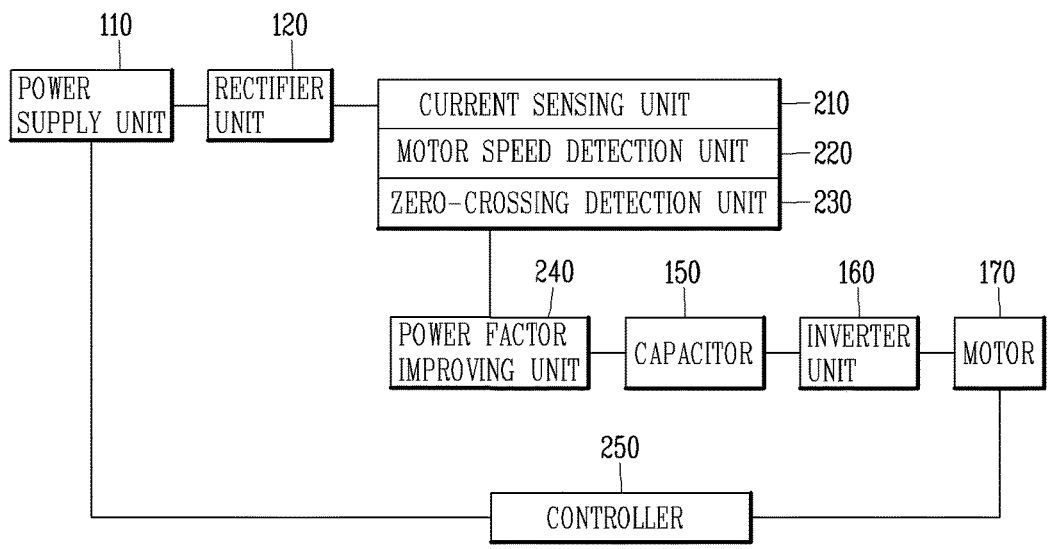
FIG. 2 is a block diagram showing a detailed configuration of the power transforming apparatus according to the present disclosure.

FIG. 2 is a block diagram showing a detailed configuration of the power transforming apparatus according to the present disclosure.

Referring to FIG. 2, the power transforming apparatus according to the present disclosure may include a power supply unit 110, a rectifier unit 120, a current sensing unit 210, a motor speed detection unit 220, a zero-crossing detection unit 230, a power factor improving unit 240 (interleaved PFC), a DC link capacitor 150, an inverter unit 160, a motor 170, and a controller 250. However, if necessary, the power transforming apparatus may include a greater number of components or may also be implemented with a smaller number of components. In addition, if it is sufficient to determine a load only by detecting an input current, the motor speed detection unit 220 may be omitted.

The rectifier unit 120 rectifies commercial power output from the power supply unit 110, and outputs the rectified power to a side of the converter, that is, the power factor improving unit 240. To this end, the rectifier unit 120 may be implemented as a full-wave rectification circuit using a bridge diode.

One or more detectors may be located between the rectifier unit 120 and a side of the converter, that is, the power factor improving unit 240. Specifically, at least part of the current sensing unit 210, the motor speed detection unit 220, and the zero-crossing detecting unit 230 may be located between the rectifier unit 120 and the power factor improving unit 240.

The current sensing unit 210 is, for example, located between the reactor 141 and the plurality of converter channels 142 shown in FIG. 1, and may be used to sense an input current, and to calculate a magnitude of the input power based thereon.

The motor speed detection unit 220 may be used to detect a rotational speed of the motor when the motor 170 connected to the power transforming apparatus 100 is driven, which may be sensed by detecting a current/voltage at a side of the inverter. Alternatively, a speed of the motor may be detected by the current sensing unit 210 and a voltage sensing unit (not shown).

The zero-crossing detection unit 230 detects a zero-crossing of a current flowing through the reactor 141 of FIG. 1. Here, detecting a zero-crossing refers to detecting a zero-crossing point of the AC power output from the rectifier unit 120.

The zero-crossing detection unit 230 detects a zero-crossing point of a PWM signal output from a plurality of converter channels included in the power factor improving unit 240 and provides the detected zero-crossing point to the controller 250. Then, the controller 250 changes target converter channels for performing PCF operations based on the received zero-crossing point.

Here, the controller 250 continuously maintains the "number" of converter channels for performing a PFC operation that is determined based on a magnitude of the input power. In other words, the "number" of converter channels determined based on the magnitude of the input power is maintained, and the target converter channels for performing switching operations are differently changed when the zero-crossing point is detected.

As described above, the PFC operation efficiency is improved in an entire load section (particularly, in a low-load section) by selecting the "number" of converter channels for performing a PFC operation based on the magnitude of the input power. In addition, when a zero-crossing point is detected, target converter channels for performing switching operations may be differently changed, thereby evenly dispersing a switch stress and a heat generation temperature of a reactor.

The power factor improving unit 240 is located between the rectifier unit 120 and the DC link capacitor 150 or between the current sensing unit 210 and the DC link capacitor 150, and provided with three converter channels to perform an interleaved PFC operation. In the present disclosure, a high-efficiency PFC operation may be performed according to a no-load, a low-load, a medium-load, and a high-load by using three converter channels.

The power transforming apparatus according to the present disclosure determines the number of converter channels for performing a PFC operation based on a speed of a motor and a magnitude of input power (or, in some cases, only with a magnitude of input power), and performs switching operations while continuously changing the converter channels even when performing a PFC operation in the same load section corresponding to the determined number.

For example, when the number of converter channels for performing a PFC operation is determined to be one based on the magnitude of the input power (a low-load section), the first converter channel that is arbitrarily selected is switched on, and subsequently, a switching-on operation is performed for a converter channel (e.g., the second converter channel or the third converter channel) other than the first converter channel. At this time, one converter channel that is switched on is maintained.

Furthermore, for example, when the number of converter channels for performing a PFC operation is determined to be two based on the magnitude of the input power (a medium-load section), two arbitrarily selected converter channels (e.g., the second converter channel and the third converter channel) are switched on, and subsequently, a switching-on operation is performed with a combination of two converter channels (e.g., the first converter channel and the third converter channel) including the remaining converter channel that has not been operated. At this time, two converter channels that are simultaneously switched on are continuously maintained.

In addition, for example, when the number of converter channels for performing a PFC operation is determined to be three based on the magnitude of the input power (a high-load section), at this time, all of the first to third converter channels are switched on.

The power factor improving unit 240 performs switching operations on at least part of the plurality of converter channels, thereby combining direct current (dc) voltages to improve power factor. The power factor improving unit 240 may include at least three converter channels, for example, a first converter channel, a second converter channel, and a third converter channel. Here, each converter channel is not limited to a specific position in the circuit of FIG. 1. In the present disclosure, an efficient PFC operation may be performed in an entire load section by determining the "number" of converter channels for performing a PFC operation and a switching time thereof.

The controller 250 does not perform a PFC operation in a no-load section. In other words, when the input power and the speed of the motor reach a first threshold value (or a first threshold range), the controller 250 performs the PFC operation. In addition, when the input power and the speed of the motor reach a second threshold value (or a second threshold range) (lower than the first threshold value) while performing the PFC operation, the controller 250 ends the PFC operation. Here, the reason why the second threshold value is set lower than the first threshold value is to allow for more stable phase switching in consideration of a load fluctuation.

In one embodiment, the controller 250 may set an enable switching time and a disable switching time differently for each number of converter channels in order to satisfy both efficiency and stability. That is, the controller 250 may impose a hysteresis condition in determining the number of target converter channels. Here, the enable switching time (or enable boundary point) may refer to a satisfied condition in which the 'number' of converter channels for performing switching operations increases. Furthermore, the disable switching time (or disable switching boundary point) may refer to a satisfied condition in which the 'number' of converter channels for performing switching operations decreases.

In the present disclosure, only the 'number' of converter channels for performing a PFC operation is determined based on a magnitude of input power, and the target converter channels switched on at every predetermined time thereafter are continuously changed. Accordingly, even when the above-described hysteresis condition is imposed, switching-on operations are performed for all of the plurality of converter channels in an entire load section.

Therefore, changing the 'number' of converter channels for performing the PFC operation actually refers to changing a switching-on cycle of the plurality of converter channels. Specifically, when the 'number' of converter channels for performing the PFC operation increases, a switching-on cycle of the plurality of converter channels becomes faster. On the contrary, when the 'number' of the converter channels for performing the PFC operation decreases, a switching-on cycle of the plurality of converter channels becomes slower.

Figure 3:
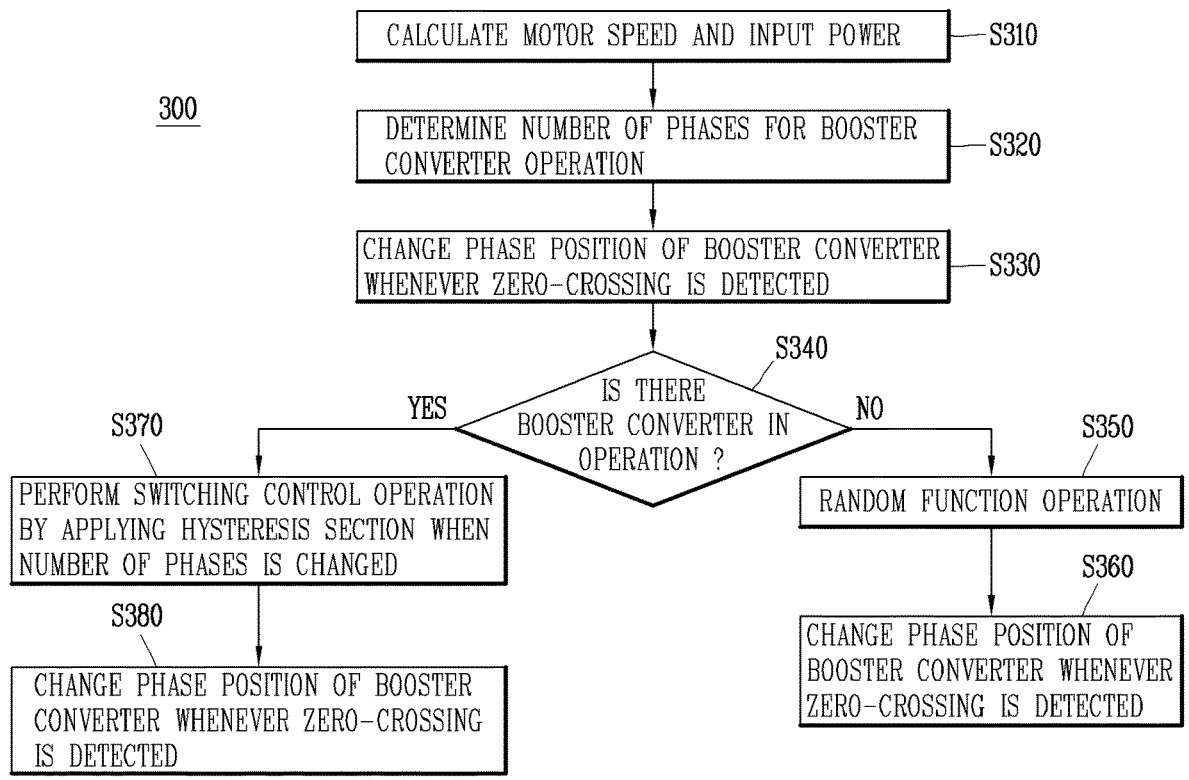
FIG. 3 is a representative flowchart for explaining an operating method of the power transforming apparatus according to the present disclosure.

FIG. 3 is a representative flowchart for explaining an operating method 300 of the power transforming apparatus according to the present disclosure.

The operating method 300 of the power transforming apparatus according to the present disclosure, which is an operating method of the power transforming apparatus for driving a motor by driving an inverter, the following operation is started as the inverter is driven. Furthermore, the operations disclosed in FIG. 3 are assumed to be performed by the controller (or 'microcomputer', 'processor', etc.) of the power transforming apparatus unless otherwise stated.

When the inverter is driven, the speed of the motor and the input power are calculated by the controller of the power transforming apparatus (S310). In one embodiment, a magnitude of the input power may be detected by sensing currents flowing through reactors of a plurality of converter channels capable of performing a PFC operation. In addition, a speed of the motor may be detected through the above-described motor speed detection unit or estimated based on a magnitude of an input current/input voltage flowing through the converter/inverter.

Figures 4, 5:
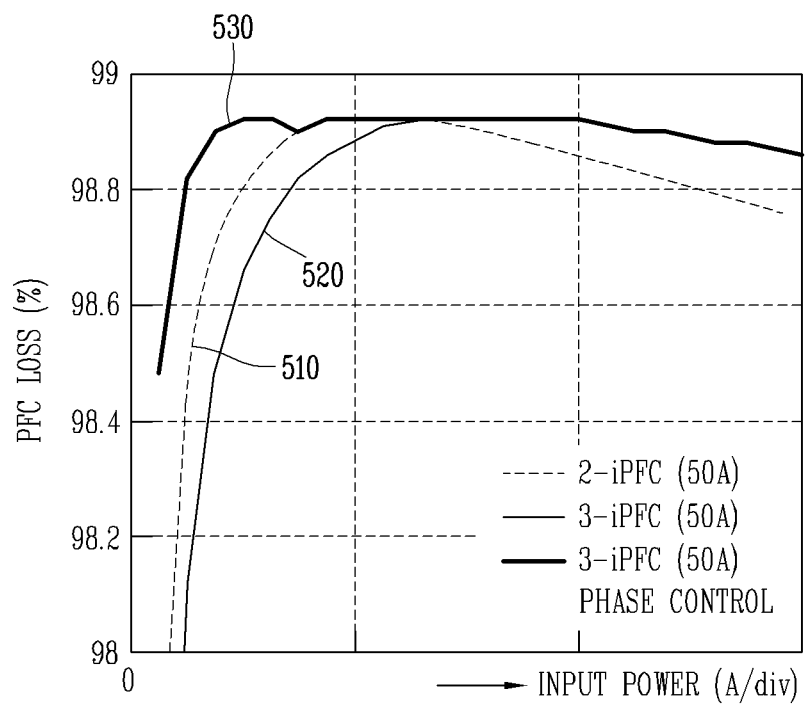
FIG. 4 is a diagram in which an example of start conditions and end conditions of an PFC operation of the power transforming apparatus according to the present disclosure is shown in a table form.
FIG. 5 is a graph for explaining the number of converter channels having the maximum efficiency for each load section in the power transforming apparatus according to the present disclosure.

In one embodiment, a condition related to whether to start a PFC operation may be set based on at least a magnitude of input power. FIG. 4 is a diagram in which an example of start conditions and end conditions of an PFC operation of the power transforming apparatus according to the present disclosure is shown in a table form.

As shown in FIG. 4, a speed of the motor and a magnitude of the input power matching a start condition of the PFC operation (PFC ON) may be preset. In addition, the speed of the motor and the magnitude of the input power matching an end condition of the PFC operation termination condition (PFC OFF) may be preset.

Specifically, when the speed of the motor is above a first threshold speed value (e.g., 18 Hz) and the magnitude of the input power is above a first threshold power value (e.g., 900 W), an on-start condition of the PFC operation (i.e., a start condition of the PFC operation) is satisfied. That is, when the motor drives according to the driving of the inverter to reach the first threshold speed value and the magnitude of the input power becomes the first threshold power value, the PFC operation is started.

Meanwhile, after the start of the PFC operation, when the speed of the motor is below the second threshold speed value (e.g., 15 Hz) and the magnitude of the input power is below the second threshold power value (e.g., 300 W), an off-start condition of the PFC operation (i.e., an end condition of the PFC operation) is satisfied. That is, when the motor being driven is decreased to the second threshold speed value and the magnitude of the input power is decreased to the second threshold power value, the PFC operation is ended.

In this way, the reason for setting the first threshold power value (and/or the first threshold speed value) matching the start condition of the PFC operation and the second threshold power value (and/or the second threshold speed value) matching the end condition of the PFC operation end condition to different values (i.e., imposing a hysteresis condition) is to allow the PFC operation to be performed more stably in consideration of a load fluctuation.

In one embodiment, the controller may operate to turn on the PFC operation as long as the magnitude of the input power satisfies the first threshold power value (e.g., 900 W) or more (without detecting the speed of the motor), and to turn on the PFC operation long as the magnitude of the input power is decreased to the second threshold power value (e.g., 300 W) or less (without detecting the speed of the motor).

Subsequently, when the start condition of the PFC operation is satisfied, the controller determines the number of phases for a booster converter operation, that is, the number of converter channels for the PFC operation (S320). In the present disclosure, it has been described as an example in which the number of converter channels capable of performing a PFC operation is three. Accordingly, the number of converter channels for a PFC operation will be determined in a range between one and three. However, in the present disclosure, the number of converter channels in a range of between one and three denotes that the number of converter channels that are simultaneously switched on is one, two, or three. Accordingly, in any case, all of the plurality of converter channels perform switching-on operations, and a switching-on cycle is varied.

As such, when the number of phases for a booster converter operation is determined, the controller performs a PFC operation, but performs a PFC operation while changing target converter channels corresponding to the determined number of phases at a time satisfying a preset condition.

Here, the time satisfying a preset condition may be a time at which a current of the reactor is zero-crossed. Furthermore, the time satisfying a preset condition may denote "every time" at which a current of the reactor is zero-crossed. Hereinafter, the latter will be mainly described, but in some cases, it may be implemented to change target converter channels only by a predetermined number of times.

As such, the controller performs a PFC operation by changing a phase position of the booster converter whenever a zero-crossing is detected (S330). To this end, the power transforming apparatus according to the present disclosure may include the zero-crossing detection unit 230 (FIG. 2) for detecting the zero-crossing of a current of the inductor. In this case, when a zero-crossing point for a current flowing through the reactor is detected, the zero-crossing detection unit 230 may provide information associated therewith to the controller to control the power factor improving unit so as to change a phase position of the booster converter.

Meanwhile, the controller may determine whether there is a converter channel already in a PFC operation, that is, a boost converter in operation (S340) to perform a different operation corresponding thereto.

According to the determination (S340), when there is no converter channel in the PFC operation, the controller may perform a random function operation (S350). Here, the random function operation refers to determining using a random function when selecting a target converter channel for performing a PFC operation among a plurality of converter channels.

For example, among the first converter channel, the second converter channel, and the third converter channel, as a converter channel for initially performing the PFC operation, any one arbitrarily selected from among the first to third converter channels may be determined as the target converter channel. This denotes that when there is no converter channel in the PFC operation, the target converter channel for initially performing the PFC operation is not predetermined as a specific converter channel. As described above, subsequent to starting a PFC operation, a converter channel that is initially switched on is not specified, thereby preventing a stress from being added to a switch (or a specific semiconductor power device) of a specific converter channel.

However, the arbitrarily selected converter channel is changed to another converter channel to perform a switching operation, for example, when the current of the inductor satisfies a zero-crossing. In other words, subsequent to the random function operation (S350), the controller controls a phase position of the booster converter to be changed whenever a zero-crossing is detected (S360).

Specifically, in the present disclosure, at a time satisfying a preset condition, for example, at a time when the current of the inductor satisfies a zero-crossing, the controller that has received the sensed information performs a PFC operation by changing the target converter channel that is switched on. Accordingly, the number of times of detecting the zero-crossing of the current flowing through the inductor corresponds to the number of times the target converter channels are changed.

In one embodiment, an appropriate number of converter channels for performing a PFC operation is determined based on a magnitude of input power, and a cycle of a PWM frequency output from the converter channel varies according to the determined number of converter channels. Thus, the target converter channels are changed every half-cycle of a PWM frequency matching the determined number of converter channels.

For example, after starting the PFC operation, when the number of converter channels for performing the PFC operation is selected to be one, the arbitrarily selected first converter channel is switched on. Furthermore, in a half-cycle of the PWM frequency matching a low-load section, the first converter channel is changed to another converter channel (e.g., the third converter channel) (since a zero-crossing point will be detected at this time) to be switched on. Then, when the half-cycle of the PWM frequency matching the low-load section is reached again (since a zero-crossing point will be detected at this time), the other converter channel (e.g., the third converter channel) is changed to the remaining converter channel (e.g., the second converter channel) to be switched on.

As described above, even while the plurality of converter channels alternately perform switching operations, the monitoring of the input power and the speed of the motor is continued. When the number of converter channels for performing a PFC operation is changed (increased/decreased) based on the input power and the speed of the motor, switching operations are performed while alternating the target converter channels every half-cycle of the PWM frequency matching the changed number.

On the other hand, when there is a converter channel already in operation based on the determination (S340), it is determined that it is a situation in which the number of phases, that is, the number of converter channels for performing a PFC operation, is changed based on the calculated speed of the motor and the magnitude of the input power.

When it is not required to change the number of converter channels for performing the PFC operation, a previous operation may be continued. On the contrary, when it is required to change the number of converter channels for performing the PFC operation, a hysteresis section is applied to perform a switching control operation (S370).

Here, the hysteresis section is set differently according to the required number of converter channels. Specifically, an enable switching time and a disable switching time are set differently according to the number of converter channels. Here, the enable switching time and the disable switching time may be preset to correspond to the detected magnitude of the input power.

Subsequently, while performing the switching control operation, the phase position of the booster converter is changed whenever a zero-crossing is detected (S380).

Specifically, for example, at a time when the current of the inductor satisfies a zero-crossing while performing a switching control operation related to changing the number of phases, the controller performs a PFC operation by changing the target converter channels. Here, the number of times of detecting the zero-crossing of the current flowing through the inductor corresponds to the number of times the target converter channels are changed. Furthermore, the cycle of the PWM frequency output from the converter channel is varied according to the number of converter channels for performing the PFC operation, and the target converter channels are changed every half-cycle of the PWM frequency matching the number of converter channels.

Meanwhile, a situation in which the number of converter channels for performing a PFC operation is changed may be divided into 1) a case where the number of target converter channels for performing a PFC operation increases than before and 2) a case where the number of target converter channels decreases.

In the present disclosure, since the plurality of converter channels alternately perform the PFC operation in an entire load section, the number of converter channels for performing the PFC operation does not indicate the number of converter channels that are switched on.

In other words, since the number of converter channels determined based on the magnitude of the input power refers to the number of target converter channels that are 'simultaneously' switched on, increasing the number of target converter channels for performing the PFC operation refers to increasing the number of target converter channels that are 'simultaneously' switched on. Similarly, decreasing the number of target converter channels for performing the PFC operation refers to decreasing the number of target converter channels that are 'simultaneously' switched on.

In the case of 1), the controller may control the plurality of converter channels, that is, the first to third converter channels, to increase an alternating switching cycle than before, based on the speed of the motor and the magnitude of the input power. That is, since the plurality of converter channels are alternately switched on in the entire load section, when it is determined that the number of converter channels needs to be increased, an output voltage is controlled to increase by changing the alternating switching cycle of the target converter channel faster than before.

In the case of 2), the controller may control the plurality of converter channels, that is, the first to third converter channels, to decrease an alternating switching cycle than before, based on the speed of the motor and the magnitude of the input power. That is, since a plurality of converter channels are alternately switched on in the entire load section, when it is determined that the number of converter channels needs to be decreased, an output voltage is controlled to decrease by changing the alternating switching cycle of the target converter channel slower than before.

As described above, in the present disclosure, a converter channel on which a PFC operation is to be initially performed may be randomly selected without specifying it in advance in connection with driving a motor, thereby preventing a stress from being added to a specific converter switch. In addition, only the 'number' of converter channels is determined based on the speed of the motor and the magnitude of the input power, and over an entire load section, the PFC operation is performed by alternating the plurality of converter channels every half-cycle of the frequency matching the determined 'number' of the converter channels, thereby evenly dispersing the input current and power loss over the plurality of converter channels (or the plurality of phases). Accordingly, the switching loss of the converter is reduced.

FIG. 5 is a graph for explaining the number of converter channels having the maximum efficiency for each load section in the power transforming apparatus according to the present disclosure. FIG. 5 is a graph showing a PFC efficiency loss in a case of performing a PFC operation with two converter channels (510), a case of performing a PFC operation with three converter channels (520), and a case of performing a different PFC operation for each load section using three converter channels, but controlling phases thereof (530).

In the present disclosure, a load operation section may be divided according to the 'number' of target converter channels that are simultaneously switched on based on the magnitude of the input current and the speed of the motor (or only the magnitude of the input current). Specifically, a section having the maximum efficiency during the PFC operation by alternating the target converter channels such that only "one" converter channel is switched on based on the magnitude of the input current and the speed of the motor may be defined as a 'low-load section'.

In the low-load section of FIG. 5 (a first partition region based on the X-axis), the case of performing the PFC operation with three converter channels (520) has a lower efficiency than the case of performing the PFC operation with two converter channels (510). It can be seen that, in the low-load section, when the three converter channels are 'simultaneously' switched, the operating efficiency is rather reduced.

Furthermore, it can be seen that the operating efficiency is higher in the case of controlling the phases of three converter channels according to the present disclosure (530) rather than in the case of performing the PFC operation 'simultaneously' on the two converter channels (510), even in the same low-load section of FIG. 5. This denotes that when PFC operation is sufficient with only one converter channel while alternately using the plurality of converter channels, the operating efficiency is higher in the case of using the PFC operation by limiting the number of converter channels that are simultaneously switched on to one (or by evenly distributing switching operations as much as the input power matching one converter channel to the plurality of converter channels) than in the case of simultaneously using two converter channels regardless of the magnitude of the input power.

In medium-load and high-load sections (second and third partition regions based on the X-axis) of FIG. 5, when the PFC operation is operated with two converter channels, it can be seen that the efficiency decreases as the magnitude of the input power (A/div) increases. On the contrary, both in the case of performing the PFC operation with three converter channels (520) and the case of controlling the phases of the three converter channels (530), it can be seen that the high efficiency is maintained at a medium-load or more. In particular, in the case of controlling the phases of three converter channels (530), since switching operations are evenly dispersed over the plurality of converter channels, both switching and power losses are reduced.

Therefore, it can be seen that the case of individually controlling the phases of the three converter channels (530) maintains a high PFC efficiency in every entire operation section of a low-load, a medium-load, and a high-load. Accordingly, in the present disclosure, based on the magnitude of the input power (and/or the speed of the motor), the PFC operation is performed by evenly distributing the switching operations as much as the input power matching one converter channel over the plurality of converter channels in a low-load section, and the PFC operation is performed by evenly distributing the switching operations as much as the input power matching two or three converter channels over the plurality of converter channels. Accordingly, it may be possible to evenly distribute a switch stress while at the same time maintaining a high PFC efficiency in the entire load section.

Figures 6A, 6B:
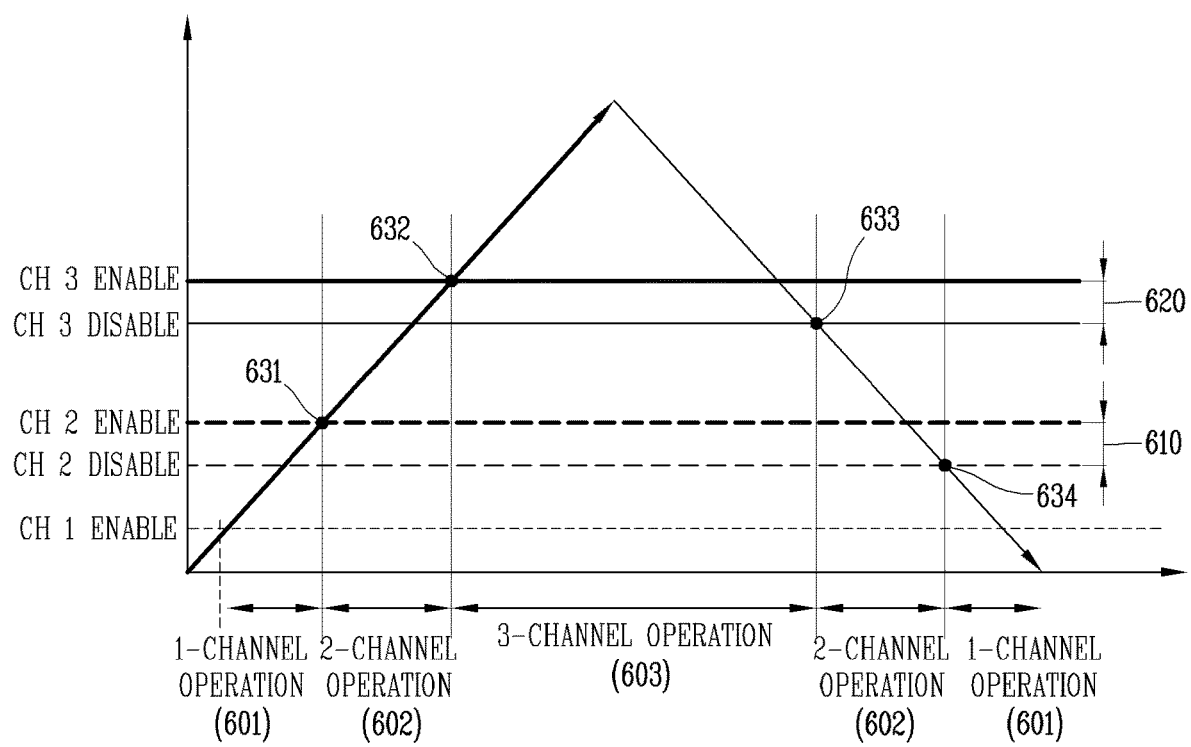
FIGS. 6A and 6B are diagrams for explaining the application of a hysteresis switching mode when determining a PFC operation and target converter channels based on input power in the power transforming apparatus according to the present disclosure.

FIGS. 6A and 6B are diagrams for explaining the application of a hysteresis switching mode when determining a PFC operation and target converter channels based on input power in the power transforming apparatus according to the present disclosure.

More specifically, FIG. 6A shows an example table of an enable switching time (or an enable boundary point) and a disable switching time (or a disable switching boundary point) that match the number of target converter channels for performing a PFC operation. Furthermore, FIG. 6B is a diagram showing that a hysteresis section is applied to a case where the number of converter channels for performing a PFC operation increases and a case where the number of converter channels decreases using the table of FIG. 6A.

Each row of the table shown in FIG. 6A denotes the number of target converter channels for performing the PFC operation. That is, CH1 601, CH2 602, and CH3 603 do not denote a specific converter channel or the number of specific converter channels, but denotes a case where the number of simultaneously switched converter channels is one, two, or three. That is, in the present disclosure, all converter channels perform a dispersed switching operation in an entire load section, and the number of simultaneously switched target converter channels is varied. In addition, the columns of the illustrated table denote input power values (900 W, 1500 W, 2500 W) corresponding to the enable boundary points and input power values (300 W, 1300 W, 2300 W) corresponding to the disable switching boundary points.

As illustrated, the input power value of the enable boundary point of CH1 (the number of simultaneously switched target converter channels is one) 601 is 900 W, the input power value of the disable switching boundary point thereof is 300 W, and a hysteresis section of about 600 W is applied thereto. Therefore, when the calculated input power value subsequent to driving the inverter reaches at least 900 W, the PFC operation is started. Furthermore, when the calculated input power value is reduced to 300 W or less while performing the PFC operation, the PFC operation is ended.

The input power value of the enable boundary point of CH2 (the number of simultaneously switched target converter channels is two) 602 is 1500 W, the input power value of the disable switching boundary point thereof is 1300 W, and a hysteresis section of about 200 W is applied thereto. Therefore, when the input power condition of 1500 W is once satisfied to correspond to the CH2 602 section, even though the magnitude of the input power thereafter is reduced to 1400 W, the PFC operation is continuously maintained while alternating two simultaneously switched target converter channels.

The input power value of the enable boundary point of CH3 (the number of simultaneous switched target converter channels is three) 603 is 2500 W, and the input power value of the disable switching boundary point thereof is 2300 W, and a hysteresis section of about 200 W is applied thereto. Therefore, here too, when the input power condition of 2500 W is once satisfied to correspond to the CH3 603 section, even though the magnitude of the input power thereafter is reduced to 2400 W, the PFC operation is continuously maintained while alternating three simultaneously switched target converter channels. On the contrary, when the magnitude of the input power is reduced to 2300 W or less, it is a situation in which the 'number' of converter channels for performing the PFC operation is reduced, and thus the PFC operation is performed while alternating two simultaneously switched target converter channels.

Subsequently, FIG. 6B shows a graph in which a hysteresis switching mode is applied in moving a section 601 in which the PFC operation is performed such that the number of simultaneously switched converter channels is one, a section 602 in which the PFC operation is performed such that the number of simultaneously switched converter channels is two, and a section 603 in which the PFC operation is performed such that the number of simultaneously switched converter channels is three.

An upward left arrow graph of FIG. 6B shows a case in which the number of target converter channels for performing the PFC operation increases as the input power (and the speed of the motor) increases. Specifically, the number of simultaneously switched target converter channels increases whenever reaching the boundary points 631, 632 subsequent to starting the PFC operation (denoting that randomly and alternately selected one converter channel operates the PFC operation).

For example, when the input power (and/or the speed of the motor) increases and reaches the first boundary point 631, the PFC operation is performed by increasing the number of simultaneously switched converter channels to two. Furthermore, when the input power (and/or the speed of the motor) further increases and reaches the second boundary point 632 while performing the PFC operation such that the number of simultaneously switched converter channels is two, the PFC operation is performed by increasing the number of simultaneously switched converter channels to three.

On the other hand, a downward right arrow graph of FIG. 6B shows a case where the number of target converter channels for performing the PFC operation decreases as the input power (and the speed of the motor) decreases. Specifically, the number of simultaneously switched target converter channels is decreased one by one whenever reaching the switching boundary points 633, 634 while performing the PFC operation such that the number of simultaneously switched converter channels is three.

For example, when the input power (and/or the speed of the motor) decreases and reaches the first switching boundary point 633 while performing the PFC operation such that the number of simultaneously switched converter channels is three, the PFC operation is alternately maintained by (decreasing) the number of simultaneously switched converter channels to be two. Furthermore, when the input power (and/or the speed of the motor) further decreases and reaches the second switching boundary point 634 while performing the PFC operation such that the number of simultaneously switched converter channels is two, the PFC operation is alternately performed such that one converter channel is switched at a time. Furthermore, when the input power (and/or the speed of the motor) continues to decrease and reaches a PFC switching-off condition (e.g., 300 W or less) even after reaching the second switching boundary point 634, the PFC operation is ended.

On the other hand, in FIG. 6B, it has been described as an example in which the number of simultaneously switched target converter channels sequentially increases from 1→2→3 and then decreases to 3→2→1, but the present disclosure is of course not limited thereto. For example, subsequent to reaching the first switching boundary point 633, when the input power increases and reaches the second boundary point 632, the PFC operation is performed by maintaining the number of simultaneously switched target converter channels to be three. Furthermore, for example, when the input power decreases and reaches the second switching boundary point 634 while the PFC operation is performed alternately such that the number of simultaneously switched target converter channels is two subsequent to reaching the first boundary point 631, the PFC operation will be performed alternately such that one converter channel is switched at a time.

As described above, in the present disclosure, even when the number of simultaneously switched target converter channels is the same, stable switching control is allowed even with a load fluctuation by applying a different magnitude of reference input power depending on whether it is an enable boundary point or a disable switching boundary point.

Figure 7:
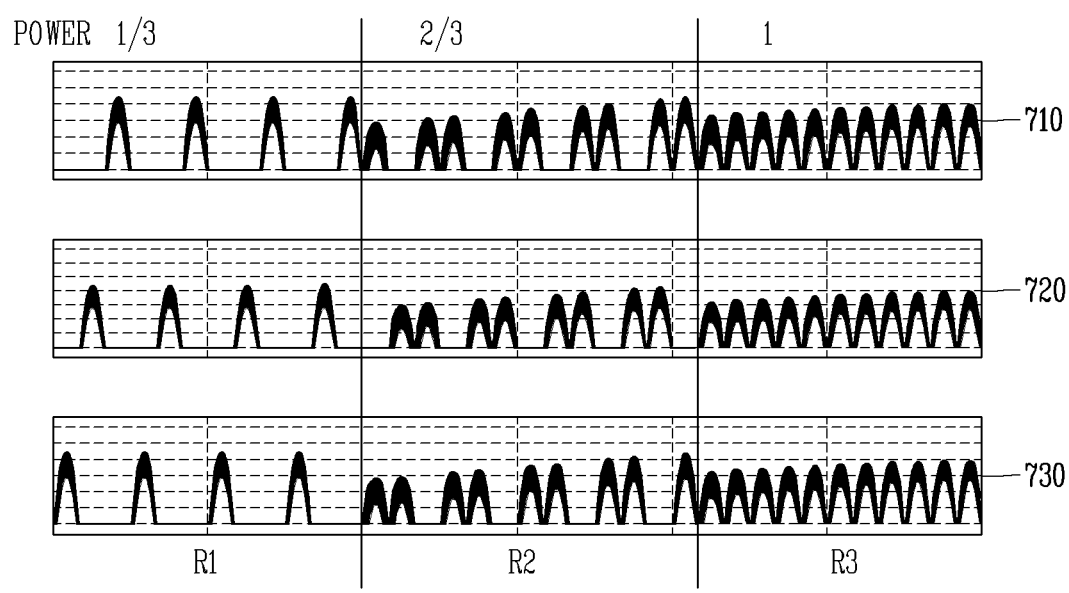
FIG. 7 is an exemplary graph illustrating a method of changing a converter channel for performing a switching operation in order to disperse a switch stress to a plurality of converter channels in the power transforming apparatus according to the present disclosure.

FIG. 7 is an exemplary graph illustrating a method of changing a converter channel for performing a switching operation in order to disperse a switch stress to a plurality of converter channels in the power transforming apparatus according to the present disclosure.

In the power transforming apparatus according to the present disclosure, the plurality of converter channels, for example, first to third converter channels, are switched on alternately every half-cycle of a frequency matching the input power and speed of the motor while performing the PFC operation based on the magnitude of the input power. Specifically, the controller varies a converter channel that is switched on for each section in which currents of the reactors respectively connected to the plurality of converter channels are zero-crossed. For convenience of description, the plurality of converter channels are referred to as a first converter channel 710, a second converter channel 720, and a third converter channel 730, but as described above, it does not denote that each converter channel is limited to a specific position and/or a specific converter channel. That is, the first converter channel 710, the second converter channel 720, and the third converter channel 730 refer to any converter channels that are individually controlled.

In FIG. 7, a first section R1 is a low-load section in which only one converter channel is alternately switched to output a PWM frequency based on a magnitude of input power.

In the first section R1, a switching-on operation matching a PWM frequency output corresponding to about ⅓ of the input power is performed. For example, after the third converter channel 730 is switched on, at a zero-crossing point detected in a half-cycle of the corresponding frequency, the second converter channel 720 is alternately switched on, and subsequently, the first converter channel 710 is alternately switched on upon the detection of a next zero-crossing point. Subsequently, the PFC operation is performed according to a cycle circulation in which the third converter channel 730 is switched on again.

In FIG. 7, a second section R2 is a medium-load section in which two converter channels are alternately switched to output a PWM frequency based on a magnitude of input power.

In the second section R2, a switching-on operation matching a PWM frequency output corresponding to about ⅔ of the input power is performed. For example, after the first and third converter channels 710, 730 are switched on, at a zero-crossing point detected in a half-cycle of the corresponding frequency, the second and third converter channels 720, 730 are alternately switched on, and subsequently, the first and second converter channels 710, 720 are alternately switched on upon the detection of a next zero-crossing point. Subsequently, the PFC operation is performed according to a cycle circulation in which the first and third converter channels 710, 730 are switched on again.

In FIG. 7, a third section R3 is a high-load section in which three converter channels are simultaneously switched to output a PWM frequency based on a magnitude of input power. In the third section R3, a switching-on operation matching a PWM frequency output corresponding to the whole input power is performed. Accordingly, in the corresponding section, the first to third converter channels 710, 720, 730 are all switched on.

In one embodiment, when the number of converter channels to be simultaneously switched increases according to changes in the input power and the speed of the motor, an alternating switching cycle for the first to third converter channels becomes faster than before. It can be seen that a switching-on cycle of each converter channel gradually becomes faster as it goes from the first section R1 to the third section R3 in FIG. 7, (in other words, an interval between a plurality of switching-on times gradually becomes narrower).

In addition, in one embodiment, when the number of converter channels to be simultaneously switched decreases according to changes in the input power and the speed of the motor, an alternating switching cycle for the first to third converter channels becomes slower than before. It can be seen that a switching-on cycle of each converter channel gradually becomes slower as it moves from the third section R3 to the first section R1 in FIG. 7, (in other words, an interval between a plurality of switching-on times gradually becomes wider).

In another embodiment, an alternating sequence of switching operations is determined based on initially selected target converter channels or a combination thereof. For example, when the second converter channel 720 is initially switched on in the first section R1 of FIG. 7, the alternating sequence of the converter channels may be different from that of FIG. 7. For example, alternate switching may be performed in a sequence of the second converter channel→the first converter channel→the third converter channel or in a sequence of the second converter channel→the third converter channel→the first converter channel.

As described above, in the present disclosure, all converter channels may be alternately switched in an entire load section, but by individually controlling the switching operations of the converter channels for each load, thereby simultaneously satisfying the dispersion of a switch stress and the operating efficiency.

Figure 8:
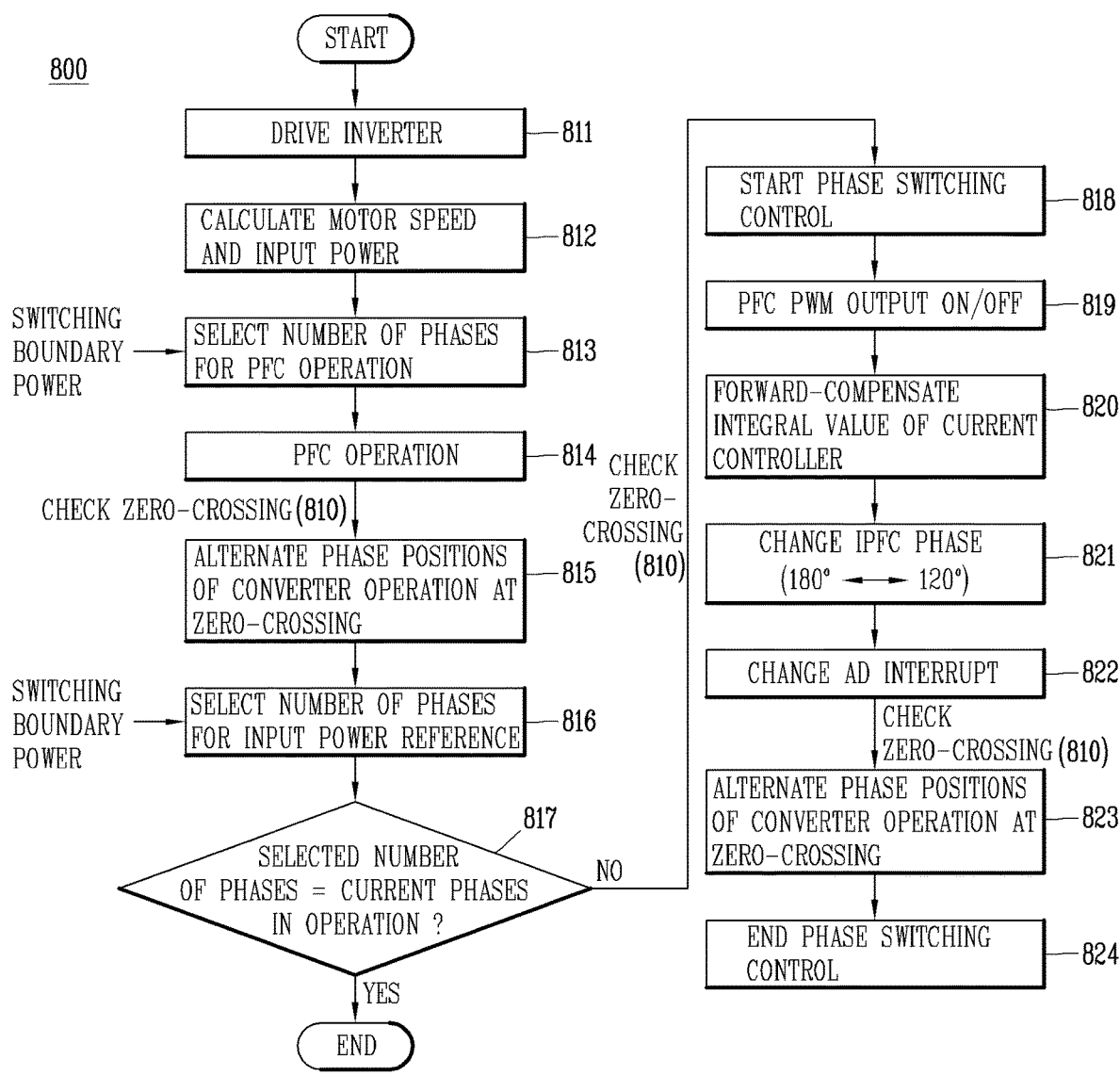
FIG. 8 is a flowchart specifically illustrating a method of performing a PFC operation by varying a converter channel in an operating method of the power transforming apparatus according to the present disclosure.

FIG. 8 is a flowchart specifically illustrating a method 800 of performing a PFC operation by varying a converter channel in an operating method of the power transforming apparatus according to the present disclosure. The operations disclosed in the operation method of FIG. 8 may be performed by a controller (or 'microcomputer') that controls each configuration of the power transforming apparatus.

Referring to FIG. 8, the method 800 of performing a PFC operation by varying a converter channel starts with driving an inverter (811). When the inverter is driven, the controller of the power transforming apparatus according to the present disclosure performs a step (812) of calculating a speed of a motor and a magnitude of input power.

When the calculated speed of the motor and the magnitude of the input power satisfy a condition for starting the PFC operation, the number of phases for performing the PFC operation, that is, the number of simultaneously switched target converter channels is selected (813). Here, the above-described hysteresis section is applied to allow stable switching control to be performed. When the number of phases is selected in this manner, the PFC operation is performed with the number of arbitrarily selected target converter channels (814).

Subsequently, after a zero-crossing point of a PWM frequency of an output voltage is checked (detected) according to the start of the PFC operation (810), the PFC operation is performed by alternating the phase positions of the converter operation (816). In this regard, the PFC operation may be controlled such that a switching time corresponding to a start command of the PFC operation corresponds to the detection time of the zero-crossing point.

Specifically, for example, in a section in which the PFC operation is allowed with only one converter channel (i.e., a low-load section), the PFC operation is performed while alternating the switching of a plurality of converter channels such that the number of simultaneously switched converter channels is one at each zero-crossing point. Furthermore, for example, in a section in which the PFC operation must be performed with two converter channels (i.e., a medium-load section), the PFC operation is performed while alternating the switching of the plurality of converter channels such that the number of simultaneously switched converter channels is two at each zero-crossing point. In addition, for example, in a section in which the PFC operation must be performed with three converter channels (i.e., a high-load section), the PFC operation is performed while simultaneously switching all three converter channels at each zero-crossing point.

While performing the PFC operation, it is determined whether the selected number of phases matches the number of current phases (817), that is, it is determined whether the "number" of simultaneously switched target converter channels is the same as before or must be increased/decreased for operation. This may be determined by continuously monitoring the speed of the motor and the magnitude of the input power. In this regard, the concept of an enable boundary point and a disable switching boundary point set based on the input power described above with reference to FIGS. 6A and 6B may be applied.

When the "number" of simultaneously switched target converter channels is the same as before, there is no further action. However, in this case, it will return to the process 812 of calculating the speed of the motor and the input power to continuously monitor whether to change the number of phases again for the PFC operation.

On the contrary, when the "number" of the simultaneously switched target converter channels is different from before, the zero-crossing point is checked (810), and then a phase switching control operation is started (818). In the phase switching control, the controller turns on/off a PWM output corresponding to the PFC operation (819), and then forward-compensates an integral value of a current controller (820). Then, an iPFC phase is changed (821). For example, when the number of simultaneously switched target converter channels is reduced from three to two, the PWM output is controlled to have the iPFC phase from 120 degrees to 180 degrees. On the contrary, for example, when the number of simultaneously switched target converter channels increases from two to three, the PWM output is controlled to have the iPFC phase from a phase difference of 180 degrees to 120 degrees. Next, an AD interrupt is changed (822), the zero-crossing point is checked again (810), and then the phase position of the converter for performing the PFC operation is alternated whenever a zero-crossing point is detected (823). Then, the phase switching control is ended (824).

As described above, the present disclosure may determine a converter channel on which a PFC operation is to be initially performed, randomly or by reflecting an operation history, in connection with driving a motor, without specifying it in advance, thereby preventing the life of a specific converter switch from being shortened due to a stress added thereto. Furthermore, the number of converter channels for performing the PFC operation is determined based on a magnitude of the input power and a speed of the motor, and switching operations are performed by changing the converter channels every half-cycle of a frequency matching a magnitude of system input power while performing the PFC operation, thereby evenly dispersing a switch stress over all of the plurality of converter channels as well as eliminating unnecessary switching. Accordingly, switching loss may be effectively reduced. In addition, the plurality of converter channels are individually controlled to perform switching distribution over all of the plurality of converter channels in an entire load section, thereby dispersing a switch stress and allowing the temperature management of a reactor connected to each converter channel. Accordingly, it is possible to prevent the life of the product from being shortened.

What is claimed is:

1. A power transforming apparatus for driving an inverter to drive a motor, the power transforming apparatus comprising:
a rectifier configured to rectify an input AC voltage;
a power factor improving unit configured to perform a power factor correction (PFC) operation that improves a power factor on a rectified voltage output from the rectifier, the power factor improving unit comprising a plurality of converter channels;
a DC link capacitor configured to store an output voltage of the power factor improving unit;
a current sensor disposed between the rectifier and the power factor improving unit; and
a controller configured to (i) based on an input power and a speed of the motor calculated using the current sensor when the inverter is driven, determine a number of target converter channels to perform a PFC operation among the plurality of converter channels, and (ii) perform the PFC operation while changing the target converter channels corresponding to the determined number of converter channels at a time satisfying a preset condition,
wherein the power factor improving unit comprises a first converter channel, a second converter channel, and a third converter channel, wherein each converter channel is coupled to a reactor, and the reactor is disposed between a switching device of each converter channel and a diode,
wherein the controller is configured to (i) based on the calculated input power and the speed of the motor, determine whether to start the PFC operation, and (ii) detect a zero-crossing of a current flowing through the reactor in response to the PFC operation of target converter channels corresponding to a predetermined sequence, and
wherein the controller is configured to (i) based on the PFC operation being started, perform an initial switching operation with at least one converter channel selected using a random function, and (ii) based on the zero-crossing being detected, perform a switching operation by changing a target converter channel according to a switching sequence determined based on the selected at least one converter channel.

2. The power transforming apparatus of claim 1, wherein the time satisfying the preset condition is a time at which a current of a reactor disposed between the power factor improving unit and the rectifier satisfies a zero-crossing.

3. The power transforming apparatus of claim 2, further comprising:
a detector that detects the zero-crossing of the current of the reactor,
wherein the controller is configured to (i) based on the zero-crossing being detected by the detector, change the target converter channels corresponding to the determined number of converter channels, and (ii) distribute a switching of the target converter channels to perform the PFC operation for the plurality of converter channels.

4. The power transforming apparatus of claim 1, wherein the controller is configured to alternately switch the first to third converter channels every half-cycle of a frequency matching the input power and the speed of the motor while performing the PFC operation.

5. The power transforming apparatus of claim 4, wherein the controller is configured, based on changing the number of converter channels to perform the PFC operation according to changes in the input power and the speed of the motor, to change an alternating switching period for the first to third converter channels.

6. The power transforming apparatus of claim 5, wherein when the number of converter channels to perform the PFC operation decreases according to a decrease of the input power, a value of a first input power matching an enable boundary point of a target converter channel is greater than a value of a second input power matching a disable switching boundary point corresponding thereto.

7. An operating method of a power transforming apparatus for driving an inverter to drive a motor, the operating method comprising:
detecting a magnitude of input power and a speed of the motor when the inverter is driven;
based on the detected magnitude of input power and the speed of the motor, determining a number of target converter channels to perform a PFC operation among a plurality of converter channels;
changing the target converter channels corresponding to the determined number of converter channels and controlling the PFC operation to be performed at a time satisfying a preset condition,
based on the input power and the speed of the motor, determining whether to start the PFC operation, wherein the plurality of converter channels comprise a first converter channel, a second converter channel, and a third converter channel, wherein each converter channel is coupled to a reactor, and the reactor is disposed between a switching device of each converter channel and a diode;
detecting a zero-crossing of a current flowing through a reactor in response to the PFC operation of a target converter channel corresponding to a predetermined sequence,
based on the PFC operation being started, performing an initial switching operation with at least one converter channel selected using a random function; and
based on the zero-crossing being detected, controlling a switching operation to be performed by changing a target converter channel according to a switching sequence determined based on the selected at least one converter channel.

8. The operating method of claim 7, wherein the time satisfying the preset condition is a time at which a current of a reactor coupled to the plurality of converter channels satisfies a zero-crossing.

9. The operating method of claim 8, comprising:
detecting the zero-crossing of the current in the reactor; and
based on the zero-crossing being detected, changing the target converter channels corresponding to the determined number of converter channels, and distributing a switching of the target converter channels to perform the PFC operation for the plurality of converter channels.

10. The operating method of claim 7, comprising:
alternately switching the first to third converter channels every half-cycle of a frequency matching the input power and the speed of the motor while performing the PFC operation.

11. An air conditioner comprising a compressor to which a power transforming apparatus is applied, wherein the power transforming apparatus comprises:
a rectifier configured to rectify an input AC voltage;
a power factor improving unit configured to perform a power factor correction (PFC) operation that improves a power factor on a rectified voltage output from the rectifier, the power factor improving unit comprising a plurality of converter channels;
a DC link capacitor configured to store an output voltage of the power factor improving unit;
a current sensor disposed between the rectifier and the power factor improving unit; and
a controller configured to (i) based on an input power and a speed of a motor calculated using the current sensor when an inverter is driven, determine a number of target converter channels to perform a PFC operation among the plurality of converter channels, and (ii) perform the PFC operation while changing the target converter channels corresponding to the determined number of converter channels at a time satisfying a preset condition, wherein the power factor improving unit comprises a first converter channel, a second converter channel, and a third converter channel, wherein each converter channel is coupled to a reactor, and the reactor is disposed between a switching device of each converter channel and a diode, wherein the controller is configured to (i) based on the calculated input power and the speed of the motor, determine whether to start the PFC operation, and (ii) detect a zero-crossing of a current flowing through the reactor in response to the PFC operation of target converter channels corresponding to a predetermined sequence, and wherein the controller is configured to (i) based on the PFC operation being started, perform an initial switching operation with at least one converter channel selected using a random function, and (ii) based on the zero-crossing being detected, perform a switching operation by changing a target converter channel according to a switching sequence determined based on the selected at least one converter channel.

12. The air conditioner of claim 11, wherein the time satisfying the preset condition is a time at which a current of a reactor disposed between the power factor improving unit and the rectifier satisfies a zero-crossing.

13. The air conditioner of claim 12, wherein the power transforming apparatus further comprises:
a detector that detects the zero-crossing of the current of the reactor,
wherein the controller is configured to (i) based on the zero-crossing being detected by the detector, change the target converter channels corresponding to the determined number of converter channels, and (ii) distribute a switching of the target converter channels to perform the PFC operation for the plurality of converter channels.

* * * * *